United States Patent [19]

Lollos

[11] 3,727,000

[45] Apr. 10, 1973

[54] MULTI-DIRECTIONAL VIDEO DISPLAY CONSOLE

[75] Inventor: John S. Lollos, Bloomfield, N.J.

[73] Assignee: National Talent Service, Inc., New York, N.Y.

[22] Filed: Sept. 24, 1971

[21] Appl. No.: 183,438

[52] U.S. Cl. ..........178/7.9, 312/7 TV

[51] Int. Cl. ........A47b 81/06, H04n 5/64, H05k 5/00

[58] Field of Search..........178/7.8, 7.9, 7.81; 312/223, 198, 7 TV

[56] References Cited

UNITED STATES PATENTS

| | | | |
|---|---|---|---|
| 3,450,454 | 6/1969 | Anders | 178/7.8 |
| 3,541,256 | 11/1970 | Anders | 312/7 TV |

FOREIGN PATENTS OR APPLICATIONS

| | | | |
|---|---|---|---|
| 988,068 | 8/1951 | France | 178/7.9 |

*Primary Examiner*—Howard W. Britton
*Attorney*—Louis Altman

[57] ABSTRACT

A multi-directional video display console is described wherein a pillar is formed of an upright transportable frame. The frame has vertically separated recesses sized and oriented to hold television receiver sets which are oriented in different directions for a multi-directional display. A video tape playback device is mounted in a bottom-located cavity and connected to drive the television sets in order to provide a common television program for multi-directional display in viewing rooms, dormitories and the like.

1 Claim, 2 Drawing Figures

MULTI-DIRECTIONAL VIDEO DISPLAY CONSOLE

This invention relates to a multi-directional video display console. A console in accordance with the invention is formed in the shape of an upright transportable pillar formed of a frame which is provided with vertically separated television set receiving recesses and a bottom-located video tape playback unit cavity. The recesses have openings oriented in different directions so that television sets can face in corresponding directions for a multi-directional display. The cavity is sized to receive video tape playback equipment which is electrically connected to the television sets to provide a common source to video signals for the multiple directional display.

The pillar console in accordance with the invention conveniently provides elevated television monitors for convenient viewing in areas subject to high traffic. The pillar with its elevated television displays is conveniently employed in areas such as dormitories or common television viewing rooms and is portable to enable the equipment to be moved as desired for suitable viewing locations.

DESCRIPTION OF THE PREFERRED EMBODIMENT

Figures 1, 2:
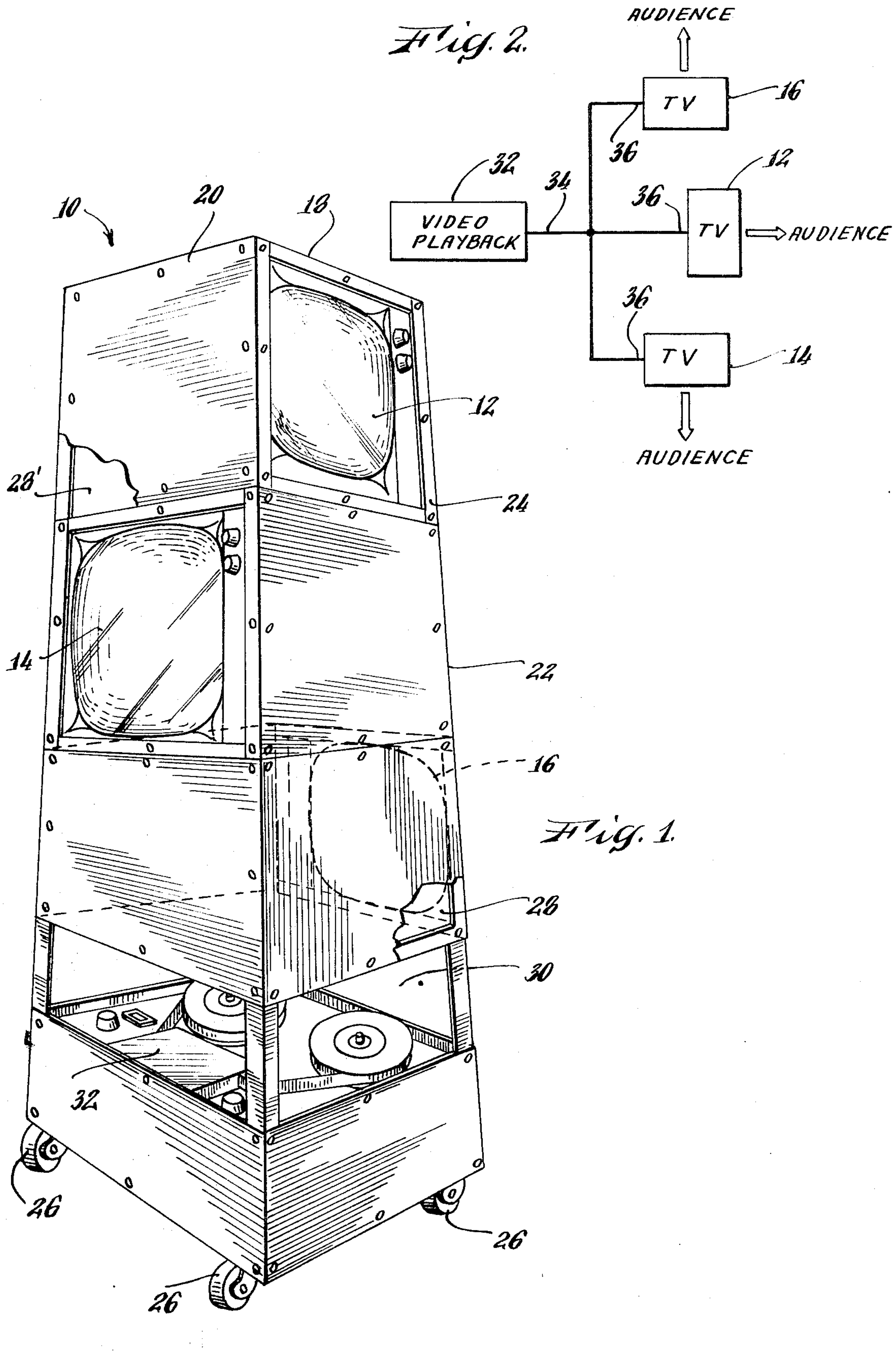
FIG. 1 is a perspective view of a multi-directional video display console in accordance with the invention.
FIG. 2 is an electrical block diagram of the multi-directional video display console as shown in FIG. 1.

With reference to FIG. 1, a video display console 10 is in the shape of a rectangular pillar having elevated television sets 12, 14 and 16 mounted in respectively different sides 18, 20 and 22. The pillar is formed of a frame 24 supported on casters 26 for ease of transportation. The frame 24 is provided with vertically separated television equipment receiving recesses such as 28. The recesses are oriented to face in different orthogonally oriented directions and, are each sized to receive a television set. Below the television receiver recesses 28 is a video tape playback equipment cavity 30 sized to receive a video tape playback device 32.

As illustrated in FIG. 2, the video tape playback device 32 provides a video output signal on an output line 34 which is connected to the inputs 36 of each of the television sets 12, 14 and 16. Hence, a common electrical video signal source is provided to the diversely directed viewing orientations of the television sets, to achieve multi-directional display of a single program.

Each of the television sets 12, 14 and 16 is securely mounted to the frame 24 and locked in to prevent removal by unauthorized personnel. The elevations of the recesses 28 are chosen to provide comfortable television viewing angles.

The device has particular utility in student unions and other gathering places such as dormitory lounges, "rec" rooms and the like, where it provides centrally located common programming to viewers distributed over a wide viewing angle, but occupies a minimum of floor space and does not require the running of cables across the floor from the playback device to TV sets.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A video display console comprising:

an upright wheel-supported pillar formed of a frame having multiple accessible sides for installing equipment, said frame having elevated vertically separated mounting recesses each of which is shaped to receive television receiving equipment and faces a selected different direction, and a bottom-located video tape playback equipment cavity;

television sets each located respectively in a recess and oriented to operatively face in different directions determined by the location of the recesses to provide a multi-directional display of video programming;

and a video tape playback device located in the cavity and electrically coupled to the television receivers in the recesses to provide a common source of video signals therefor.

* * * * *